(No Model.)
A. B. VAAG.
COMBINED FORK AND SHOVEL.
No. 421,364. Patented Feb. 11, 1890.
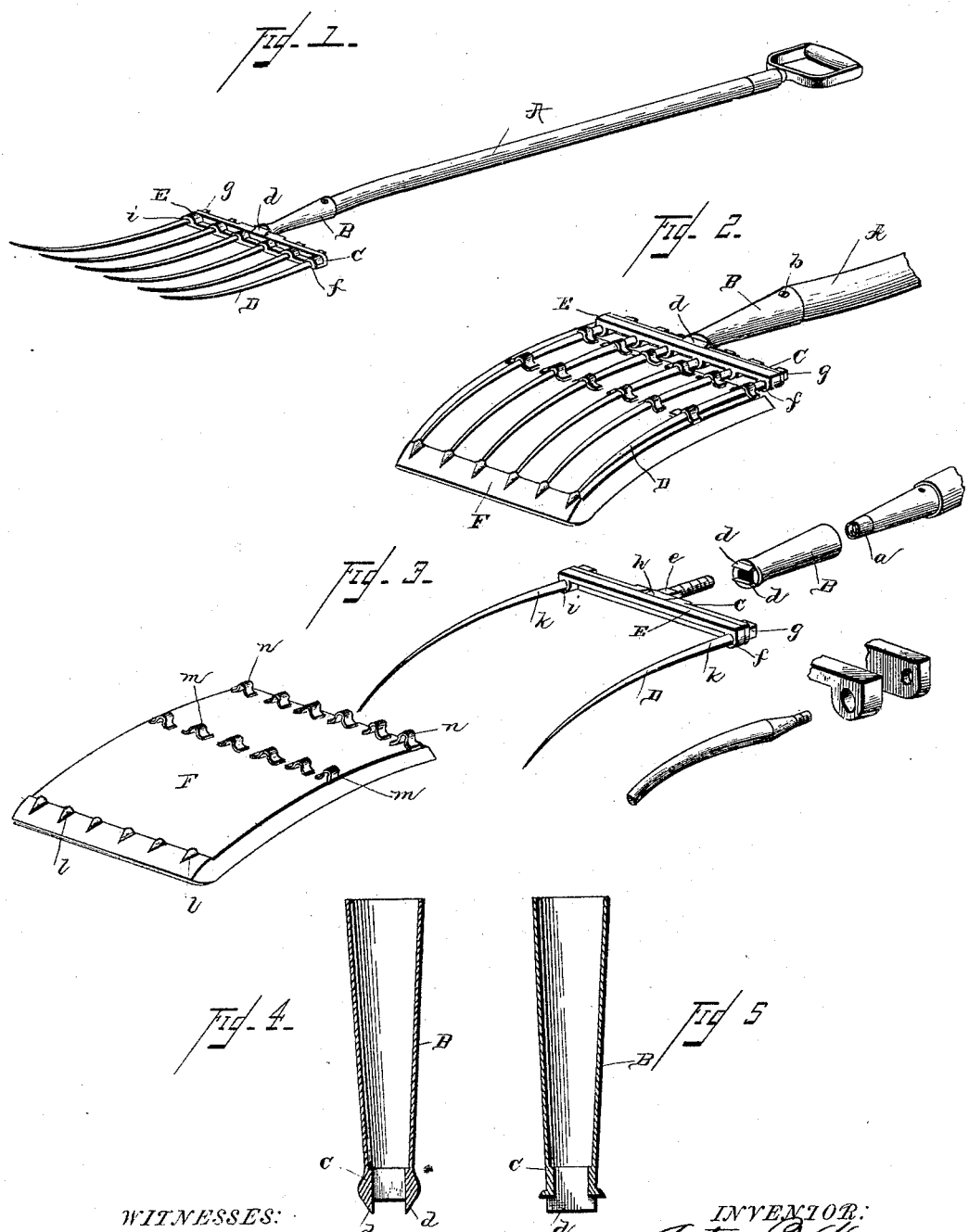
WITNESSES:
INVENTOR:
Anton B. Vaag,

UNITED STATES PATENT OFFICE.

ANTON B. VAAG, OF HILLSBOROUGH, (DAKOTA TERRITORY,) NORTH DAKOTA.

COMBINED FORK AND SHOVEL.

SPECIFICATION forming part of Letters Patent No. 421,364, dated February 11, 1890.

Application filed November 5, 1889. Serial No. 329,286. (No model.)

*To all whom it may concern:*

Be it known that I, ANTON B. VAAG, a citizen of the United States, and a resident of Hillsborough, in the county of Traill and Territory of Dakota, have invented certain new and useful Improvements in Combination Forks and Shovels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my fork. Fig. 2 is a similar view of the back of the fork with one pattern of shovel-blade embodying my invention. Fig. 3 is a perspective detail view of the parts detached, showing but two of the tines and nuts shown in Fig. 1; and Figs. 4 and 5 are longitudinal sectional views of the outside ferrule, taken, respectively, at right angles to each other.

This invention relates to improvements in combination forks and shovels, or forks adapted to receive detachable shovel-blades. I aim to provide a tool of this class in which the parts are quickly adjustable and easily repaired when broken.

Referring to the drawings, in which like letters of reference denote corresponding parts in all the figures, the letter A designates a handle having a small ferrule $a$, a hole for the insertion of the fork-shank, and shaped to receive a ferrule B, adapted to be fastened by a small wood-screw $b$. The bottom end of the ferrule B, is thickened, enlarged, and interiorly squared, as shown, and a shoulder $c$, formed by this thickened portion, fits against the end of the handle and ferrule $a$. The end of the ferrule is also provided with two lips $d$, the purpose of which will be hereinafter stated.

The shank of the fork is preferably screw-threaded to turn into the handle, and is provided with a squared portion $e$, adapted to fit the interiorly-squared bottom end of the ferrule B. The shank is an integral part of the bar C, through the holes $f$ of which the threaded ends of the tines D project, and against which the nuts $g$ are screwed for retaining the tines in place. The bar C is thickened at the center for strength, and said thickened portion is provided with grooves $h$, which receive the lips $d$. Against the bar C rests the bar E, provided with a series of elliptical socket-shaped holes $i$. The tines D are essentially elliptical in cross-section and have a sloping portion $k$, adapted to fit into the holes $i$. By this arrangement each tine can be drawn up tightly by its nut $g$, and any tine can be removed or inserted at will. Thus when a tine is broken a new one may be inserted in a moment.

In constructing the shovel-blade F, adapted to be attached to the fork, the end is turned back and welded down, forming a series of sockets $l$, into which the ends of the tines slide when the blade is attached to the fork. Preferably at about one-third the length of the blade the back of the shovel is furnished with a series of clips $m$, and a second series $n$ is near the top of the blade. In placing the shovel onto the fork the tines slip through the clips $n$ and $m$ and the sockets $l$ receive their ends. Thus the shovel-blade may be quickly attached to or detached from the fork. In the accompanying drawings the fork is shown with six tines and the other parts constructed and arranged accordingly. This can be varied without departing from the spirit of the invention. It is moreover evident that the patern of the shovel-blade may be different from the one shown.

Having thus described my invention, I claim and desire to secure by Letters Patent of the United States—

The herein-described fork, comprising the following elements: a handle, a ferrule having a thickened and interiorly-squared and lipped end, a centrally-thickened shank-bar having holes to receive the tines, and a shank having a squared portion and threaded end, a bar having elliptical socket-shaped holes, tines having sloping and screw-threaded upper end, and nuts adapted to fasten said tines, all constructed and arranged substantially as described, and adapted to receive a shovel-blade, substantially as shown.

In testimony that I claim the foregoing as my own I have hereunto affixed my signature in presence of two witnesses.

ANTON B. VAAG.

Witnesses:
J. F. SELBY,
I. K. IVERSON.